Aug. 3, 1954 W. W. PHARIS 2,685,616

TRUNK CIRCUIT MONITORING SIGNAL

Filed Oct. 8, 1952

INVENTOR.
WILLIAM W. PHARIS

BY Francis E. Blake

ATTORNEY

Patented Aug. 3, 1954 2,685,616

UNITED STATES PATENT OFFICE 2,685,616

TRUNK CIRCUIT MONITORING SIGNAL

William W. Pharis, Rochester, N. Y., assignor to Stromberg-Carlson Company, a corporation of New York Application October 8, 1952, Serial No. 313,667

3 Claims. (Cl. 179—18)

Figure 1:
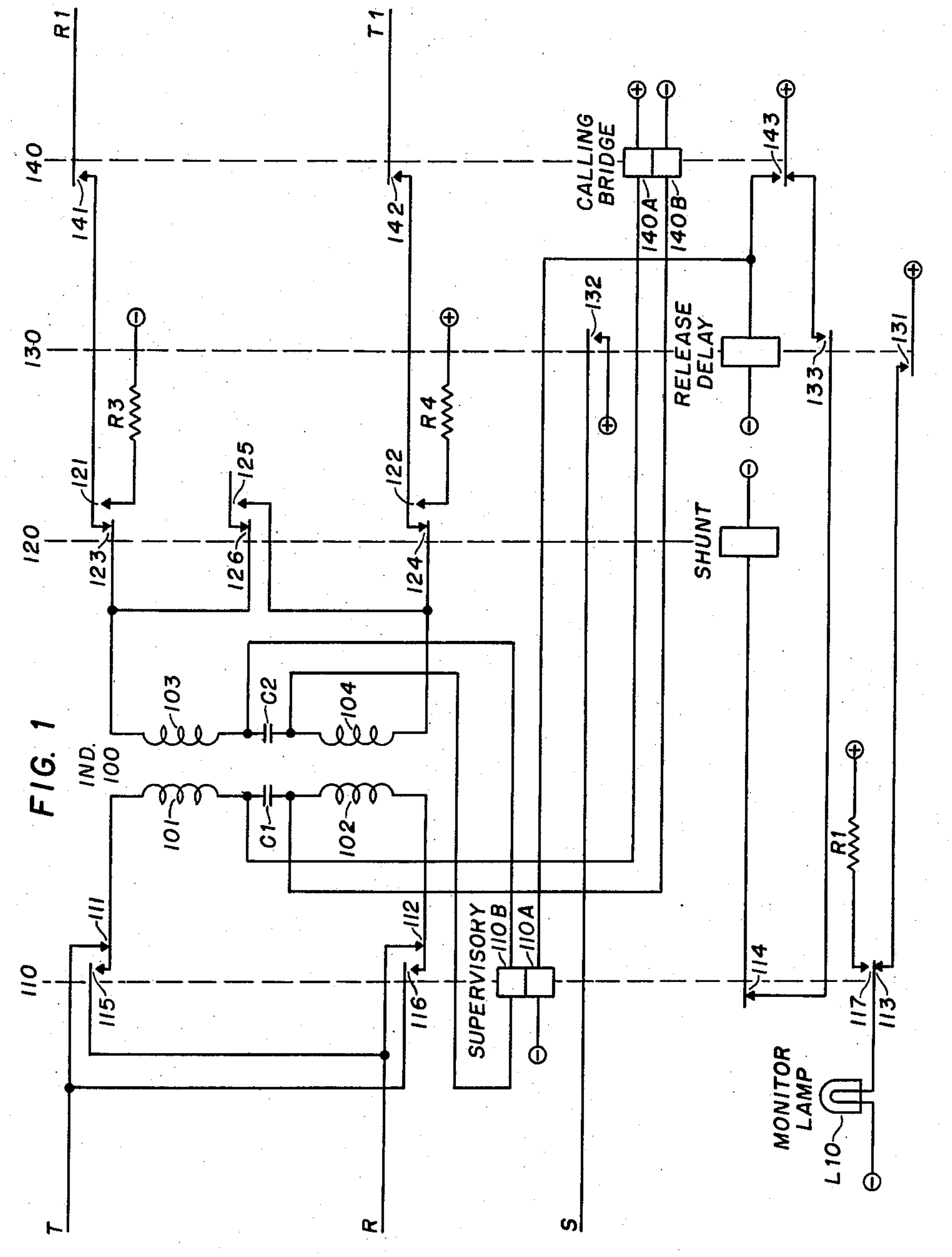

The present invention relates to telephone systems and more particularly to trunk circuits having improved monitor signal arrangements to indicate the operative condition of the circuit.

Modern telephone exchanges employ considerable amounts of relatively complex equipment and included with the equipment are various individually selectable circuits such as selector circuits, connector circuits, and trunk circuits which have different conditions of operation. In the case of a trunk circuit which, for example, may be used to provide an outgoing dial to dial connection from a selector to a trunk line, the circuit may have three conditions of operation, i. e., seized during dial pulse transmission, a talking condition, and released. In supervising the operation of a telephone exchange embodying such equipment it is often desirable to be informed of the operative condition of the various circuits such as the trunk circuit mentioned above.

It is an object of the present invention to provide a trunk circuit having a monitor signalling system which will indicate in a simple and direct manner the operative condition of the trunk circuit, i. e., seized, talking, or released.

A feature of the invention is the provision of a signal lamp and a control circuit therefor in association with a trunk circuit and operative to provide a bright lamp indication when the trunk circuit is seized, a dim lamp indication when the trunk circuit is in the talking condition, and no lamp signal when the trunk circuit is released and available for seizure.

Further objects, features, and the attending advantages of the invention will be apparent with reference to the following specification and drawing in which the sole figure is a circuit diagram of a simplified form of trunk circuit embodying the monitor lamp signal arrangement.

Referring to the drawing, the trunk circuit is connected between the incoming tip, ring and sleeve conductors T, R and S, respectively, and the outgoing trunk line conductors T1 and R1. In the description of the invention, the power supply for energizing the various relays and the signal lamp is not shown, and positive and negative symbols are employed to show the respective connections to the power supply. As is customary in the art, the positive terminal of the usual battery power supply (not shown) is connected to ground and will be referred to hereinafter as ground, whereas the negative terminal of the power supply will be referred to as battery. It should also be understood that the incoming tip and ring conductors are arranged to be connected to a calling line loop circuit (not shown) for seizing the trunk circuit and that the outgoing trunk line tip and ring conductors, T1 and R1, are arranged to be connected in a reverse battery called line loop circuit when the called party answers and the extension of the call is thus completed.

Upon seizure of the trunk circuit, the calling bridge relay 140 is energized from ground through winding 140A, repeat coil winding 101, normal contacts 111, calling party loop circuit, normal contacts 112, repeat coil winding 102, and calling bridge relay winding 140B to battery. The operation of the calling bridge relay 140 closes contacts 141 and 142 of the outgoing tip and ring conductors, respectively, and connects ground at operated contacts 143 to energize the release delay relay 130. At the same time, ground is connected through operated contacts 143 to the high-resistance winding 110A of the supervisory relay 110 which, however, does not operate at this time since the current through the high-resistance winding is not sufficient to cause such operation. It should be mentioned that the supervisory relay 110 is provided with differentially connected windings 110A and 110B and the winding 110B is energized over conductors T1 and R1 with a polarity opposite to the energization of winding 110A until the called party answers and reverse battery supervision becomes effective to reverse the polarity in winding 110B and operate relay 110 as will be later described.

According to the invention, the monitor signal lamp L10 is connected from battery through normally closed contacts 113 to normally open contacts 131 which are operated by the operation of the release delay relay 130 upon seizure of the trunk circuit and the aforementioned operation of the calling bridge relay 140. With the release delay relay 130 operated and contacts 131 closed, the monitor lamp L10 is energized from ground through operated contacts 131, normal contacts 113 to battery, and is thereby brightly illuminated to indicate seizure of the trunk circuit.

The aforementioned operation of release delay relay 130 connects ground at operated contacts 132 to the incoming sleeve conductor S to mark this trunk circuit busy, as is well known. The operation of release delay relay 130 through operated contacts 133 and normally closed contacts 114 establishes a circuit to energize the slow release shunt relay 120 when the calling bridge relay 140 releases on the first dial impulse to restore contacts 143 to normal. Shunt relay 120, being slow to release, remains operated during transmission of dial impulses. The operation of shunt relay 120 closes contacts 121 and 122 and opens contacts 123 and 124 to connect ground through resistance R4 to the outgoing trunk line ring conductor R1 and battery through the resistance R3 to the outgoing trunk line tip conductor T1. During the meshing of the contacts of the shunt relay 120, contacts 125 are closed and contacts 126 are open to momentarily short circuit repeat coil windings 103 and 104, and prevent any inadvertent operation of the supervisory relay 110 due to an accidental energizing of the relay coil 110B by the battery and ground connection through the resistors R3 and R4.

With the seizure of the trunk circuit and the operation of the relays 120, 130 and 140, respectively, battery and ground dial pulsing may be transmitted to the remote equipment over the trunk line conductors T1 and R1 by the periodic restoration of the calling bridge relay 140 in response to the dial impulses, as is well known in the art. During pulsing of the calling bridge relay 140, the release delay relay 130 and slow release shunt relay 120 are periodically and alternately energized to remain operated during the impulsing cycle. At the end of the dial impulses the calling bridge relay 140 is again operated to maintain the operation of the release delay relay 130. However, the slow release shunt relay 120 is restored since ground is no longer connected thereto in view of the operated position of contacts 143. With shunt relay 120 restored, the trunk line tip and ring conductors T1 and R1 are again connected through operated contacts 141 and 142 and normal contacts 123 and 124 to the windings 103 and 104 of the repeat coil IND100 It will be noted that talking condensers C1 and C2 are provided across which the winding 140A of the calling bridge relay and the winding 110B of the supervisory relay are connected, respectively.

When the extension of the call is thus completed and the calling party answers, the talking battery connections over conductors T1 and R1 to winding 110B of the supervisory relay 110 are reversed, and relay 110 therefore operates to open contacts 111 and 112 and close contacts 115 and 116 to reverse talking battery from the calling bridge relay 140 to the incoming tip ring conductors T and R. The operation of the supervisory relay 110 also opens contacts 113 and closes contacts 117 to change the energization circuit of the monitor lamp L10 to be thereafter energized from ground through the series resistor R1. Thus, in such manner, the monitor lamp L10 is energized to provide dim illumination and indicate that the trunk circuit is now in talking condition.

When the called party hangs up, the differentially connected supervisory relay 110 is restored due to re-reversal of talking battery on conductors T1 and R1 by the opening of the called party loop circuit and contacts 117 are opened and contacts 113 closed to again brightly illuminate the monitor lamp L10 through the obvious circuit including operated contacts 131 of release delay relay 130. Thus an indication is signaled that the trunk circuit is still seized by the calling line although not in the talking condition since the called party has disconnected. When the calling party hangs up and the calling loop circuit to the calling bridge relay 140 is thereby opened, relays 140 and 130 restore to open contacts 131 and break the circuit to monitor lamp L10 and cause the lamp to be extinguished thus indicating that the trunk circuit is no longer seized and is free for seizure by other calling circuits. It is apparent that the trunk circuit being described is under control of the calling party since the restoration of the calling bridge relay 140 when the calling party hangs up is effective to restore contacts 141 and 142 to their normal open position and break the called party loop circuit to the supervisory relay 110.

While the monitor signal lamp circuit of the invention has been particularly described in connection with a one-way outgoing dial to dial trunk circuit, it should be understood that the signaling circuit may be applied equally as well to other forms of trunk circuits having a relay operated upon seizure of the circuit and another relay operated when the extension of the call is completed and the calling party answers, with the aforementioned relays having contacts to control the energization of the monitor lamp in a manner to provide bright illumination during seizure and before completion of the call and dim illumination after completion of the call during which the trunk circuit is in talking condition. It should be apparent that a special advantage of this arrangement is a conservation of power since the signal lamp is only dimly illuminated and draws consequent small amounts of current during the comparatively long time when the trunk circuit is in talking condition as contrasted to the short time interval when the trunk circuit is seized and the talking connection is not yet obtained.

Various modifications may be made within the spirit of the invention and the scope of the appended claims.

What I claim is:

1. In a telephone system, the monitor signal lamp arrangement for indicating the operative condition of a trunk circuit including in combination, a source of power, a signal lamp, a resistance, a first circuit including first switch means to connect said lamp directly to said source of power to provide relatively bright illumination, a second circuit including second switch means to connect said lamp to said source of power in series with said resistance to provide relatively dim illumination, first means responsive to seizure of the trunk circuit by a calling line to operate said first switch means and illuminate said lamp, and second means responsive to the answering by the called line to operate said second switch means to provide relatively dim illumination of said lamp.

2. In a telephone trunk circuit for extending a call from a calling line over a trunk line to a called line, said trunk circuit having a first relay connected to be operated when said trunk circuit is seized by the connection of the loop circuit of the calling line and a second supervisory relay to be operated when the called line loop circuit is connected over the trunk line and trunk circuit, the monitor signal lamp arrangement for indicating the operative condition of the trunk circuit including in combination, a source of power, a signal lamp, a resistance, a first circuit controlled by the operation of said first relay to be operated to connect said lamp directly to said source of power when said first relay is operated to thereby provide relatively bright illumination of said lamp, and a second circuit controlled by the operation of said supervisory relay to be operated to connect said lamp in series with said resistance to said source of power when said supervisory relay is operated to thereby provide relatively dim illumination of said lamp.

3. In a telephone trunk circuit for extending a call from a calling line over a trunk line to a called line, said trunk circuit having a first relay connected to be operated when said trunk circuit is seized by the connection of the loop circuit of the calling line and a second supervisory relay to be operated when the called line loop circuit is connected over the trunk line and trunk circuit, the monitor signal lamp arrangement for indicating the operative condition of the trunk circuit including in combination, a source of power, a signal lamp, a resistance, a first circuit including normally open switch contacts of said first relay to be operated to connect said lamp directly to said source of power when said first relay is operated to thereby provide relatively bright illumination of said lamp, said supervisory relay having normally closed contacts in series with said first circuit, and a second circuit including normally open switch contacts of said supervisory relay to be operated to connect said lamp in series with said resistance to said source of power when said supervisory relay is operated to thereby provide relatively dim illumination of said lamp, the operation of said supervisory relay to open said normally closed contacts being effective to break said first circuit connection of said lamp.

No references cited.